Patented July 20, 1926.

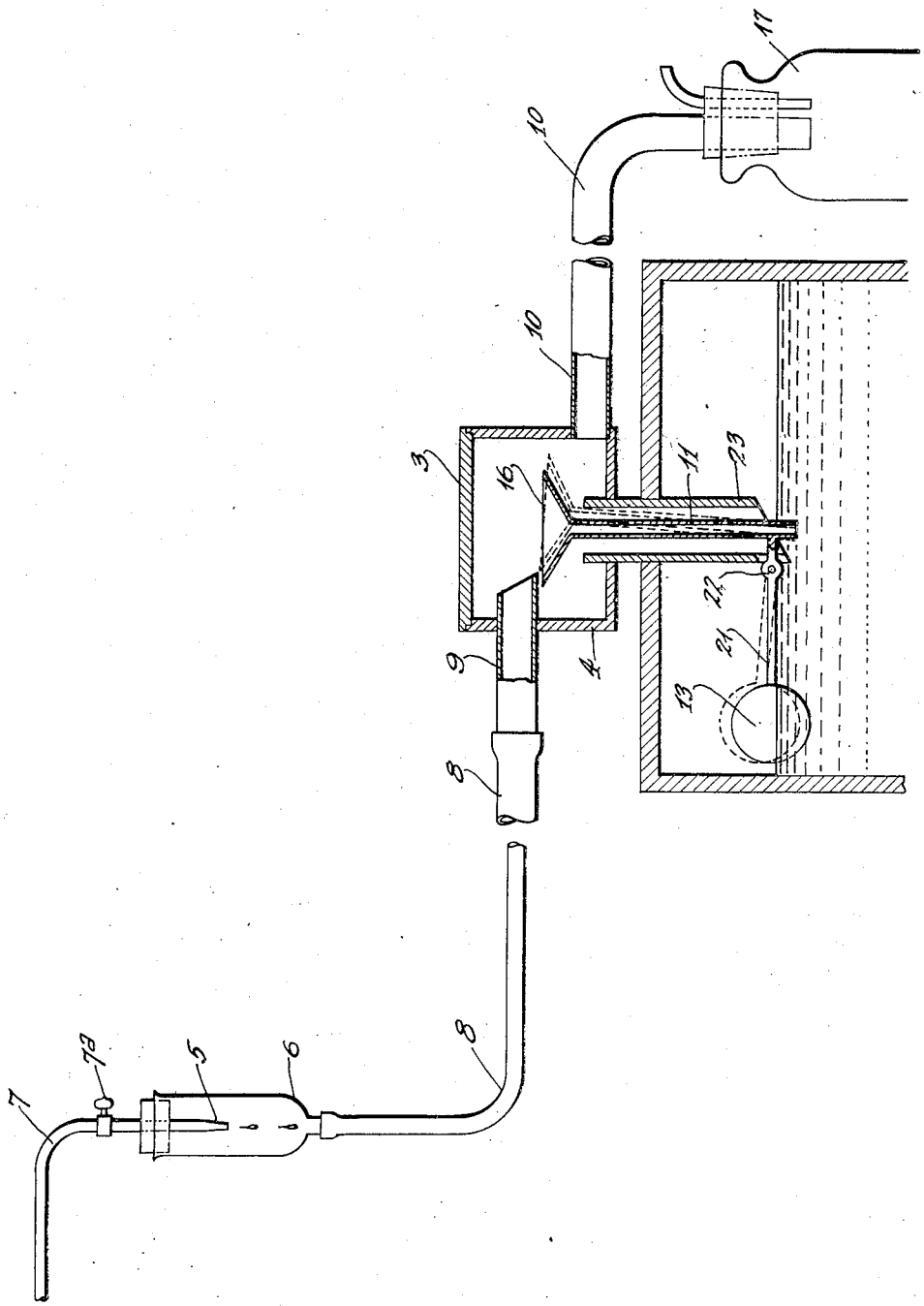

1,592,906

UNITED STATES PATENT OFFICE.

JACK D. SARTAKOFF, OF FOREST HILLS, NEW YORK.

AUTOMATIC BATTERY FILLER.

Application filed January 31, 1923. Serial No. 616,103.

It is well known that the electrolyte in the storage battery or accumulator must be replenished from time to time due to evaporation and other causes and the present invention is an automatic battery filler adapted for use in conjunction with storage batteries or accumulators and functioning to keep the electrolyte level therein at a predetermined height.

Devices for the accomplishment of this general result have heretofore been suggested. They usually embody a receptacle or reservoir containing distilled water or electrolyte which is adapted to be fed through tubes or pipes into the battery cells, the flow of such water being controlled in prior constructions in various ways. In my prior Patent No. 1,349,297, issued August 10, 1920, the inflow of such water into the battery is controlled by a float operated valve. In the copending application of Sartakoff and Forrest, Serial No. 421,075, the water is fed from its container into a reservoir where it forms a pool and float operated capillary means are employed for feeding such water from the pool into the cell when the electrolyte level therein recedes below a predetermined minimum.

The object of the present invention is to improve upon prior constructions for the purpose of greatly simplifying and minimizing in the parts employed and for accomplishing the same general result in a more simple and reliable way.

Speaking generally, the present invention contemplates the feeding of water or an electrolyte through a conduit into close proximity to the cell and discharging such liquid from the end of the conduit in such manner that it may be transmitted directly from the delivery end of the conduit either directly into the cell or preclude it from entering the cell. In accordance with this invention, the liquid may constantly flow through the conduit in greater or lesser quantities as may be required, but is only directed into the cell at such times as the cell requires replenishing.

In practically carrying out the invention, I feed water through a conduit, the delivery end of which is positioned over a basin so that normally the water delivered by the conduit falls into the basin and thereafter flows out of the same, either to a suitable container or to a smaller basin associated with another cell. With each cell, I associate a float controlled flow directing member, so mounted and constituted that when the electrolyte level in the cell falls below the predetermined minimum, said member will serve to direct the liquid from the delivery end of the conduit directly into the cell, but when the cell has been replenished sufficiently to bring its electrolyte level above the predetermined minimum, the current directing member will be automatically moved into a position to effect a discharge of the liquid into the basin, so that it will no longer flow into the cell until such time as the electrolyte level again recedes below the predetermined minimum.

Various changes in mechanical details of construction may be made in a general arrangement without departing from this invention, but, in its preferred practical form, the current directing member may be conveniently and economically constructed in the form of a trough which may be moved or tilted by a float submerged in the electrolyte of the cell from a position wherein it will direct the liquid fed from the supply reservoir either directly into the cell or system to be discharged into the basin associated therewith. This form of construction is highly efficient in its operation, obviates the necessity of nice adjustments, eliminates the necessity of employing valvular means with attendant objections and is thoroughly reliable in its operations.

Features of the invention, other than those adverted to, will be apparent from the hereinafter detailed description and claims, when read in conjunction with the accompanying drawings.

The accompanying drawings illustrate one practical embodiment of the invention, but the construction therein shown, is to be understood as illustrative, only, and not as defining the limits of the invention.

The drawing shows a battery feeding system embodying the present invention.

The present invention is susceptible to use either with storage batteries or accumulators adapted for use in connection with motor vehicles or for the stationary storage batteries or accumulators such for example as those employed in the telephone exchanges. For the purpose of illustration, I have shown the latter construction in the drawings and have illustrated one cell 1, although more than one can be fed. These cells are of any suitable conventional form and constitute no part of the present invention.

Supported on each cell is a casing 3, the lower portion 4 of the interior of which constitutes a basin. Water, electrolyte or other suitable liquid is fed from a suitable source of supply through a pipe 7, which terminates in a dropper 5 positioned within a sight tube 6. A valve 7$^a$ is shown for controlling the flow of liquid through the pipe 4, so as to regulate the feed as may be desired.

In practice I prefer to use the sight tube and dropper 5, though, if desired, they may be eliminated and liquid may be fed directly through the pipe 5 to the tube 8, which, in the illustrative showing, constitutes the outlet of the sight tube.

The tube 8 leads to a conduit 9, which is associated with the casing 3 and enters the same in the upper portion of the casing, in such manner that liquid flowing through the conduit will gravitate from the inner end of the conduit to the bottom of the basin 4 and will flow through an outlet conduit 10 out of the basin. The conduit 10 is placed near the bottom of the basin or at any event at a lower elevation than the conduit 9. Conduit 10 may discharge into the basin of the next cell or into receptacle 17 for receiving the overflow.

Liquid may thus flow into each casing through the inlet conduit 9 and out of such casing through the exit conduit 10 preferably in a more or less steady stream or by a succession of drops as may be deemed desirable, the volume of such flow depending largely upon the requirements of the associated cell. If the cell is large and requires frequent replenishings of relatively large volumes, the flow of replenishing liquid naturally would have to be greater than if the cell were small and required only occasional replenishing. In any event, there is sufficient flow of liquid through the inlet conduit 9 to satisfy the requirements of the cell.

Under ordinary conditions, the liquid feed to the basin 4 from the inlet conduit simply flows out of the outlet conduit without entering the cell and this operation continues so long as the electrolyte level in the cell remains above the predetermined minimum, but in the event the electrolyte level recedes below its minimum, it is the object of this invention to divert the flow of liquid into the cell until such time as the desired level has been restored.

In the construction shown in the drawings, a float 13 is secured to a rigid bar 21 pivoted at 22 to the lower end of a cylindrical guide 23 which is rigid with the basin 4. A duct 11 is rigid with the inner end of the bar 21 and extends upwardly through the guide 23 and carries at its upper end a rigidly attached flow directing member 16 and said guide constitutes with the arm a bell crank pivoted at its elbow. The parts are so arranged and proportioned that when the electrolyte level falls below the predetermined minimum, the float will carry the member 16 into a position to underlie the discharge end of the inlet conduit as is shown in full lines with the result that liquid flowing through the conduit 9 will fall on the member 16 and be directed thereby into the duct 11 and thence to the cell. However, as the electrolyte level rises, the float will be elevated with the result that the conduit 11 will be tilted in the guide 23 to such extent that the member 16 will be moved to a position (shown in dotted lines) wherein it no longer underlies the discharge end of the conduit, whereupon liquid flowing through the conduit will fall into the basin and flow out of the outlet thereof until such time as the electrolyte level has again fallen below the predetermined minimum.

The structure is of the most simple mechanical nature, not apt to get out of order and entirely reliable. It is not open to the well known disadvantages of valves which are apt to stick and fail to operate when operation thereof is most needed, nor does it depend upon any other scientific phenomena than that of gravity. The structure is such that it may be far more economically manufactured than any prior construction of which I am aware and are more positive and reliable in their operation than any such prior construction.

The foregoing detailed description sets forth a view of the practical embodiments of the invention, but this invention is to be understood as not limited to mechanical details, but as broadly novel as is commensurate with the appended claims.

Having thus fully described the invention, what I claim as new and desire to secure by Letters Patent is:

1. An electrolyte level maintainer for storage batteries embodying a battery, a duct for delivering liquid into proximity with the battery, a tube extending into the battery, and a float connected to the tube and adapted when the electrolyte level in the battery recedes below a predetermined minimum to shift the upper end of the tube to a point below the delivery end of the feed duct to permit liquid to be delivered through the tube from the duct into the battery, said float serving when the electrolyte level rises above the predetermined minimum to shift the tube into a position removed from the delivery end of the duct.

2. An electrolyte level maintainer for storage batteries embodying a battery, a basin supported on the battery above the electrolyte level therein, an inflow duct for feeding electrolyte into the interior of the basin and above the bottom thereof, an outflow duct leading out from substantially the bottom of the basin, a tube leading from the basin into the interior of the cell, and a float for moving said tube into a position below the delivery end of the feed duct to receive liquid therefrom and deliver it into the cell and for moving said tube from beneath the end of the feed duct to preclude the discharge of liquid into the cell.

3. An electrolyte level maintainer for storage batteries embodying a battery, a liquid delivery duct extending into proximity with the battery, a bell crank lever pivoted at its elbow, a float connected to one arm of the bell crank and the other arm of the bell crank being in the form of a tube adapted through movements of the float to be brought into and out of cooperative relation with the delivery end of the feed duct to allow or preclude the feed of liquid from the duct into the battery.

4. An electrolyte level maintainer embodying a battery, a feed duct for feeding liquid into proximity with the battery, a bell crank pivoted within the battery and having one arm in the form of a tube provided with a flaring mouth, and a float secured to the other arm of the bell crank and adapted to be operated by the electrolyte in the battery to move the flared end of the tube into a position to receive liquid from the delivery end of the feed duct when the electrolyte level recedes below a predetermined minimum and to move the flared end of the tube from beneath the discharge end of the duct when the electrolyte level rises above a predetermined minimum.

In testimony whereof I have signed the foregoing specification.

JACK D. SARTAKOFF.